United States Patent [19]
Smialowicz

[11] 3,771,749
[45] Nov. 13, 1973

[54] EMERGENCY AIRCRAFT EVACUATION APPARATUS AND METHOD

[75] Inventor: Edward H. Smialowicz, Point Pleasant, N.J.

[73] Assignee: The Garrett Corporation, Los Angeles, Calif.

[22] Filed: Jan. 5, 1973

[21] Appl. No.: 321,265

[52] U.S. Cl. .............................. 244/137 P, 182/48
[51] Int. Cl. ............................................ B64d 25/14
[58] Field of Search .................... 244/137 P, 137 R, 244/129 D, 129 S; 182/48, 77; 193/25 R, 25 B, 25 C; 9/14, 30, 41

[56] References Cited
UNITED STATES PATENTS

| | | | |
|---|---|---|---|
| 3,633,853 | 1/1972 | Collins | 244/137 P |
| 3,598,215 | 8/1971 | Summer et al. | 244/137 P |
| 3,554,344 | 1/1971 | Summer et al. | 244/137 P |
| 3,465,991 | 9/1969 | Banas et al. | 244/137 R |
| 3,463,287 | 8/1969 | Smith | 182/48 |
| 3,461,995 | 8/1969 | Mitchell | 993/25 B |
| 2,765,131 | 10/1956 | Boyle | 244/137 P |
| 2,531,263 | 11/1950 | Fink et al. | 182/77 |

Primary Examiner—Duane A. Reger
Assistant Examiner—Galen L. Barefoot
Attorney—Robert S. Swecker

[57] ABSTRACT

Emergency aircraft evacuation slide apparatus and method for automatically displacing an inflatable slide from a stowed position in a container on the door of the aircraft to a deployed position on the exterior of the aircraft ready for evacuation of passengers. The apparatus includes a pack board slidably received in the container mounted on the interior of the door. The deflated slide is folded and stowed in a pack that is provided on the pack board. The slide is connected to the floor of the aircraft by the girt which projects through a trap door in the bottom of the container. The apparatus includes a pair of spring biased arms on the pack board which cooperate with ejector straps extending between the lower end of the board and the interior of the container above the pack board to eject the slide and pack board through the doorway when the door is raised.

14 Claims, 9 Drawing Figures

PATENTED NOV 13 1973 3,771,749

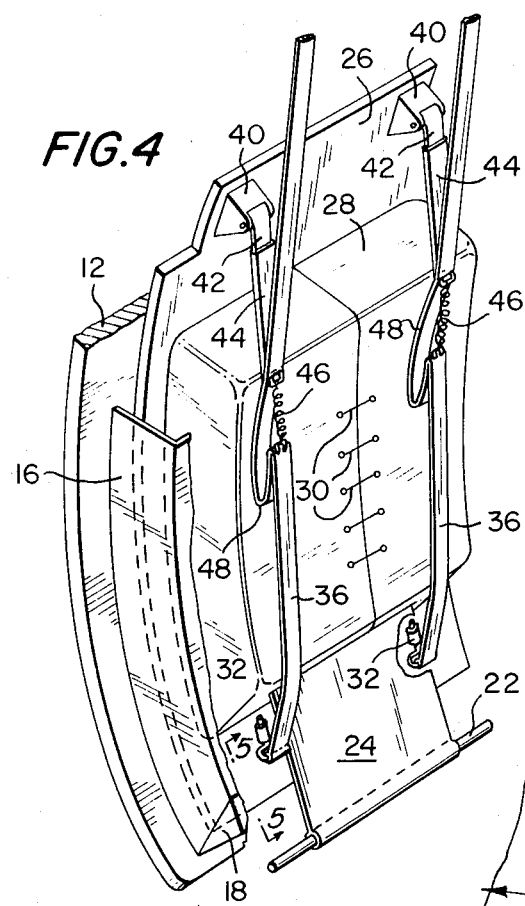
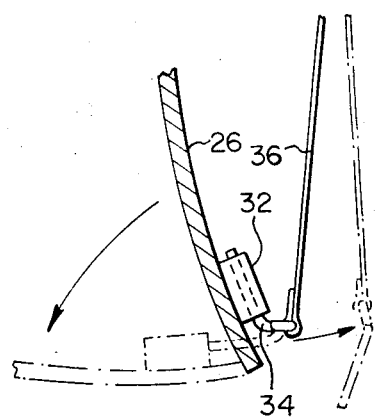
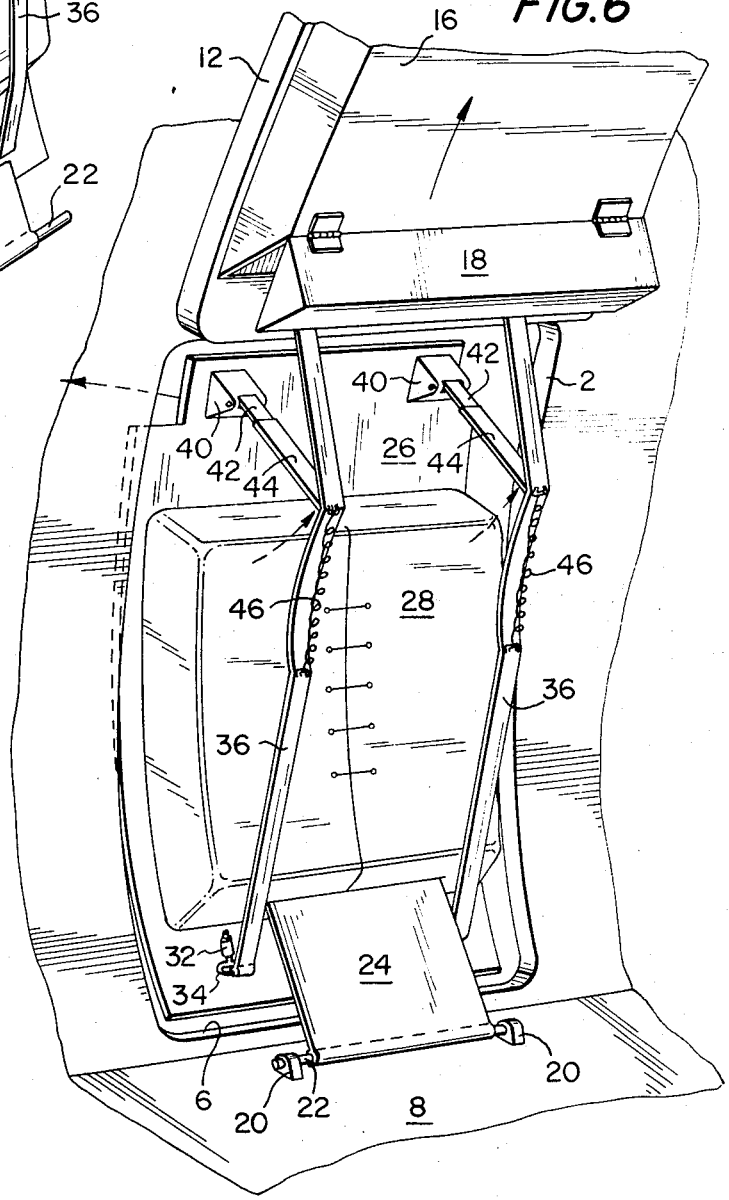
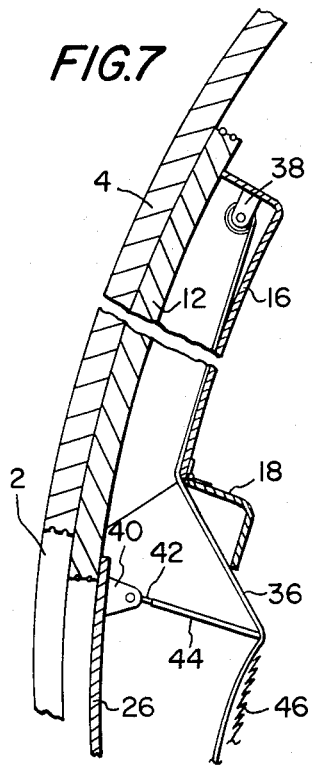

EMERGENCY AIRCRAFT EVACUATION APPARATUS AND METHOD

BACKGROUND OF THE INVENTION

This invention relates to aircraft emergency evacuation systems, and more particularly to apparatus and method for releasing an inflatable escape slide from its stowed position to a deployed position in the event of an emergency.

Inflatable escape slides are installed on substantially all passenger carrying aircraft to provide a rapid means for evacuating passengers in the event of an emergency. Inflatable escape slides typically include an inflatable structural beam member constructed of fabric with a slide surface provided on the upper side of the beam member, a supply of compressed gas for inflating the beam structure, and a girt and girt bar arrangement for connecting the upper end of the beam member with the aircraft at the bottom of the doorway. Examples of prior inflatable escape slide arrangements are disclosed in U.S. Pat. Nos. 2,765,131 and 3,102,623.

In the past, inflatable escape slides have been folded into a pack which requires a minimum of space in the interior of the aircraft. Often, the slide pack is mounted on the interior of the aircraft door. When the door is closed, a girt bar is connected with brackets on the floor inside the doorway. In the event of an emergency, it is only necessary to open the door, so that the girt bar pulls the slide from the pack as the door opens, thereby allowing the slide to fall through the doorway. Subsequently, the slide is inflated rapidly and is ready for evacuation of passengers within a very short time after the door is opened.

In most aircraft, the passenger doors are hinged at the side and swing outwardly as the door opens. When the slide is packed on the inside of the door, the outward swinging movement of the door displaces the slide to the outside of the doorway, and as the slide is pulled from the pack, it falls by gravity between the open door and the sill, so that subsequent inflation causes the slide to be deployed properly.

In certain new aircraft, the outwardly opening door has been replaced by a door which is opened by sliding along tracks extending upwardly along the interior of the fuselage into the ceiling of the cabin. The door is raised by electrical power. It has previously been proposed to mount the inflatable escape slide pack on the interior of the door, and to pull the slide from the pack as the door is raised, in the same general manner as was previously done with the outwardly opening passenger doors. This arrangement has not been acceptable because there is a danger that the fuselage will not be level, especially if one of the landing gear has collapsed, and the slide may not fall outwardly through the doorway, but instead may be deposited on the inside of the doorway, where it would be unsafe to inflate the slide.

Prior emergency evacuation slides have been designed for deployment with primary reliance on the aircraft crew, usually airline stewardesses, for deployment of the inflatable escape slide. Since new airplanes are being designed with larger capacities, the evacuation equipment has become larger and more complex, and manual deployment of the escape slides is impractical. Therefore, it is necessary to provide a system that displaces the inflatable escape slide from a stowed condition to a deployed condition completely automatically.

OBJECTS AND SUMMARY OF THE INVENTION

It is an object of this invention to provide an aircraft emergency evacuation system that operates automatically to displace an inflatable escape slide from a stowed condition to a deployed position ready for use by passengers to evacuate the aircraft.

A further object of the invention is to provide an emergency evacuation system for ejecting the inflatable escape slide outwardly through the door of the aircraft when the fuselage is in an abnormal position.

Another object of the invention is to provide emergency evacuation system that functions rapidly in order to minimize the time required for evacuating passengers from the aircraft.

These objects are accomplished in accordance with a preferred embodiment of the invention by mounting the deflated escape slide on a pack board, and installing the pack board in a container provided on the interior of the door. The girt is temporarily secured to the floor of the aircraft inside the doorway by a girt bar and brackets on the floor. The door is opened by moving inwardly and then upwardly along the interior wall of the fuselage until it is positioned directly above the doorway. A pair of ejector straps are secured at one end to the interior of the container on the door and the other end of each strap is connected to the pack board by a releasable connector. Spring loaded arms on the pack board are biased to move from a packed position adjacent the pack board to an extended position in which the arms project toward the interior of the aircraft. The ejector straps are hingedly connected with the outer ends of the moveable arms, and tension is maintained in the straps by means of an elastic link in each strap between the junction with the arm and the removeable connector. During movement of the door from a closed position toward an open position, the girt and girt bar pull the pack board and folded escape slide from the container on the door, as the door moves upwardly. As the push arms move through the opening in the bottom of the container, the arms are released and swing inwardly, while being partially restrained by the tension in the straps. As soon as the door has raised sufficiently for the upper end of the pack board to pass between the bottom of the doorway and the bottom of the door, the string force provided by the arms and by the elastic link in the strap pushes the pack board and the deflated slide outwardly through the doorway. As the lower end of the pack board pivots about the girt on the escape slide, the connectors release the straps, inflation of the slide is initiated, and the straps retract into the interior of the container. As soon as the slide is inflated, passengers can be evacuated from the aircraft by sliding on the surface from the doorway to the ground.

DESCRIPTION OF THE DRAWINGS

This preferred embodiment of the invention is illustrated in the accompanying drawings in which:

FIG. 4 is a perspective view showing the escape slide on the pack board as packed in the hard container on the interior of the door;

FIG. 5 is an enlarged cross-sectional view of the pack board along the line 5—5 in FIG. 4;

FIG. 6 is a perspective view from the interior of the fuselage showing the apparatus as the pack board is being ejected through the doorway;

FIG. 7 is a cross-sectional view of the fuselage showing the door partially raised;

DESCRIPTION OF THE PREFERRED EMBODIMENT

The emergency aircraft evacuation slide apparatus of this invention is shown in association with a passenger doorway 2 in the fuselage 4 of the aircraft. The doorway 2 has a sill 6 which is approximately at the level of the floor 8 in the cabin of the fuselage.

Figure 1:
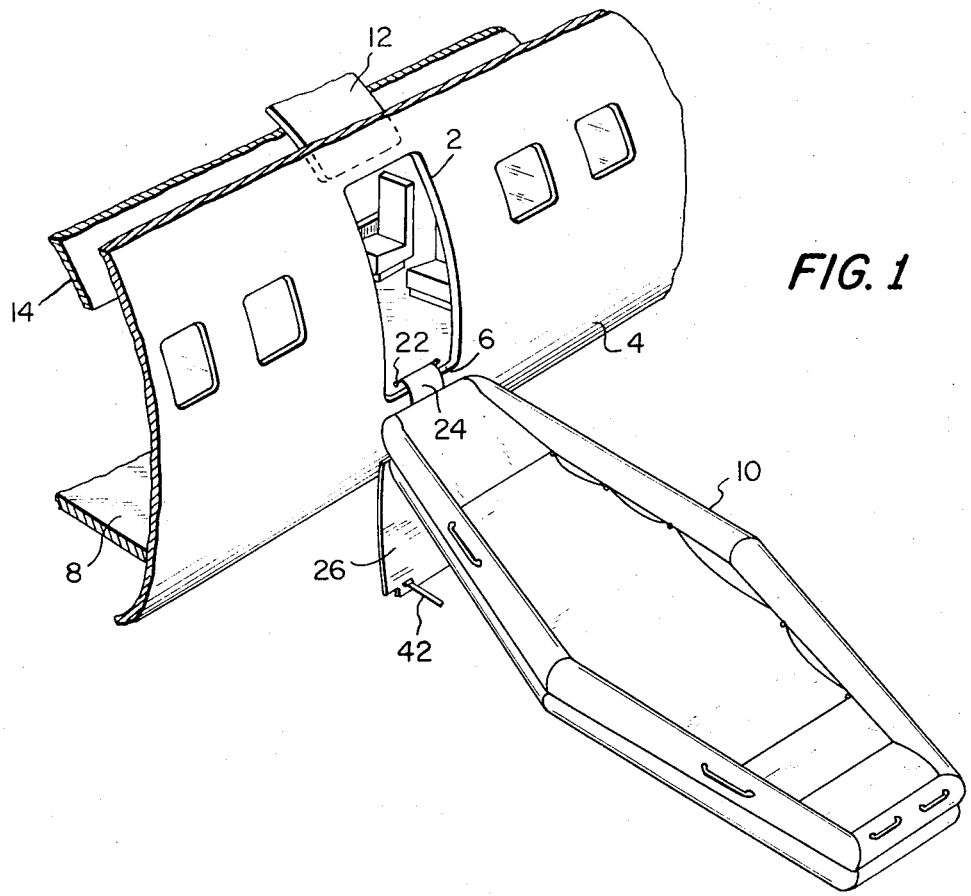
FIG. 1 is a perspective view, partially schematic, showing a portion of the aircraft fuselage adjacent the doorway and an inflatable escape slide deployed with the lower end resting on the ground.

An inflatable escape slide 10 is secured to the floor 8 of the aircraft at its upper end in alignment with the sill 6 and the lower end of the inflatable escape slide 10 rests on the ground surface. The inflatable escape slide illustrated in FIG. 1 is designed for dual purpose use as an inflatable escape slide and as a raft to support evacuating passengers in the event of a ditching at sea.

The fuselage 4 is provided with a door 12 for closing the doorway. The door is mounted on tracks or other means to permit the door to open and close automatically. The door is shown in the open position in FIG. 1 and is raised directly above the doorway 2. While raising, the door moves along the interior of the wall of the fuselage and is concealed by a false ceiling panel 14. The mechanism for raising and lowering the door does not form a part of this invention, and such mechanisms are commonly known in this art.

Figure 2:
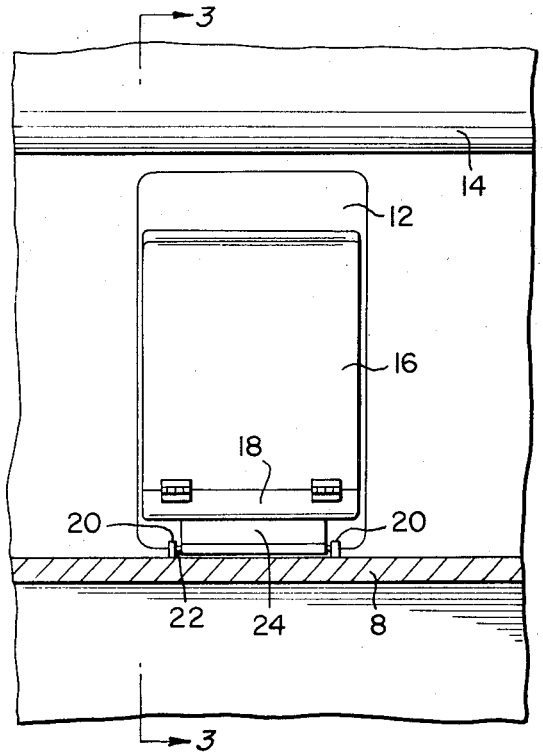
FIG. 2 is a cross-sectional view of the fuselage along the line 2—2 in FIG. 3.
Figure 3:
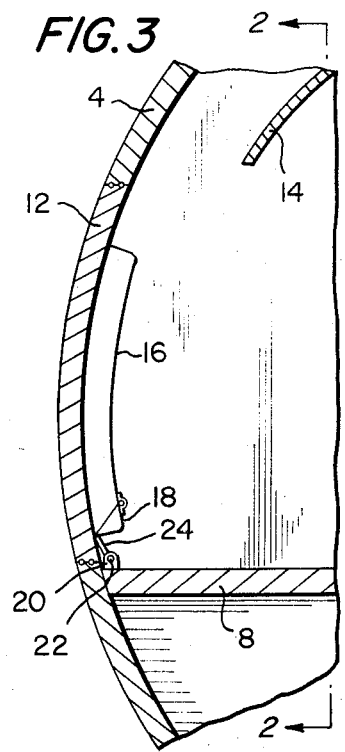
FIG. 3 is a cross-sectional view of the fuselage along the line 3—3 in FIG. 2.

The door 12, as viewed from the interior of the aircraft is shown in FIG. 2 in a closed position. A hard container 16 is mounted on the interior side of the door 12. The container 16 has a trap door 18 which is spring biased toward a closed position, as shown in FIGS. 2 and 3. Fittings 20 secured on the floor 8 rigidly support a girt bar 22. A girt 24, which is preferably made of fabric is secured at one end to the girt bar 22 and at the opposite end to the upper end of the inflatable escape slide 10 (FIG. 1).

As shown in FIG. 4, a pack board 26 supports the inflatable escape slide pack 28. The deflated escape slide 10 is folded and placed in the fabric pack 28, with the girt 24 projecting downwardly along the interior surface of the pack board 26 as shown in FIG. 4. The pack 28 supports the folded slide and has releasable fasteners, which are indicated schematically at 30 which open the pack 28 and release the folded slide when a predetermined tension is applied to the girt 24.

A tubular bracket 32 is secured on the pack board 26 on each side of the girt 24, and a release pin 34 is received in each of the tubular brackets 32. Each of the release pins 34 is attached to an ejector strap 36. Each ejector strap is wound on a reel 38 which is secured to the interior of the top of the hard container 16. Each reel 38 includes a spring for applying tension in each strap 36.

A pair of pylons 40 project outwardly from the pack board 26. An arm 42 is hingedly mounted on each pylon 40 and is spring biased toward a position extending approximately perpendicular to the surface of the pack board 36. Each arm 42 is received in a sleeve 44, and the base of each sleeve is hingedly attached to the ejector strap 36. The sleeves 44 preferably have sufficient rigidity to resist bending of the sleeves by the arms 42.

An elastic link, preferably in the form of a wire spring 46 is provided in each ejector strap 36. Each spring 46 is connected at one end with the strap adjacent the base of the sleeve 44 and at the opposite end with a location on the strap between the sleeve 44 and the release pin 34, so that a loop 48 is formed in the strap 36 adjacent the sleeves 44. The elastic link provides the force to push the packboard out of the doorway in a controlled manner, without lifting the pack board 26 away from the floor 8.

In operation, the door 12 is initially in its closed and locked position, as shown in FIGS. 2 and 3. In the event of an emergency, the door is opened automatically by moving inwardly and then upwardly along the interior of the fuselage. As the door begins to move upwardly, the girt, which is held to the girt bar 22, applies a downward force on the pack 28 and the pack board 26. The tension in the girt 24 is sufficient to prevent the pack board from moving upwardly with the door, but is not sufficiently great to release the fasteners 30 on the pack. As the door 12 continues to move upwardly, the ejector straps 36 unwind from the reels 38, while tension is maintained in the straps 36. When the door has raised sufficiently to uncover the arms 42, the arms swing outwardly in response to the spring bias in the arm hinges, so that the ejector strap 36 associated with each is in the position shown in FIG. 7 and the elastic link 46 is extended. It should be noted that the upper end of the pack board 26 slides along the interior surface of the door 12 and is retained in the doorway 2 until the lower end of the door passes over the upper edge of the pack board 26.

Figure 8:
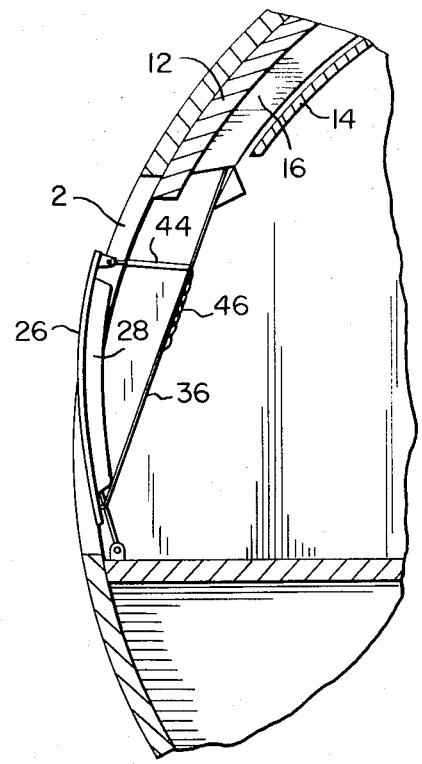
FIG. 8 is a cross-sectional view of the fuselage showing the pack board being ejected through the doorway and FIG. 9 is a cross-sectional view of the fuselage showing the pack board and escape slide outside the doorway, after the straps are released.
Figure 9:
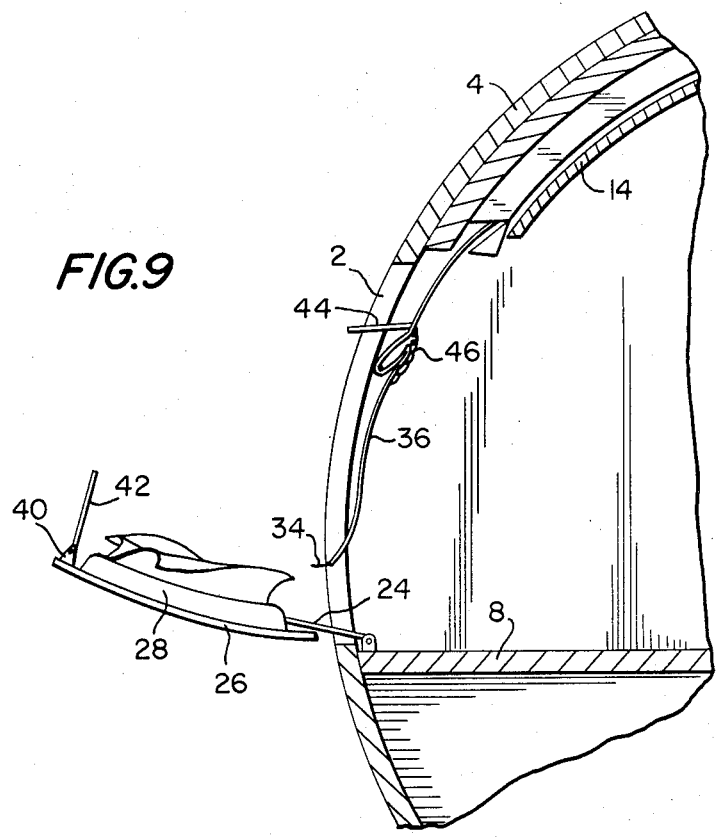

In FIG. 6, the lower edge of the door 12 is spaced above the upper edge of the pack board 26, thereby allowing the pack board to swing outwardly through the doorway 2, with the bottom of the pack board being held adjacent the door sill 6 by the girt 24. As shown in FIGS. 6 and 7, the straps 36 and the tension links 46 apply a force longintudinally of the arms 42, thereby displacing the upper end of the pack board rapidly outward through the doorway 2. As shown in FIG. 8, each strap 36 assumes a straight configuration when the upper end of the pack board 26 has moves outwardly through the doorway 2, but the momentum of the pack board continues its swinging movement. Since the arms 42 are slidingly received in the sleeves 44, the arms 42 pull out of the sleeves as the outward movement of the pack board continues. When the pack board has moved to the position shown in FIG. 9, the pins 34 attached to the lower end of each ejector strap 36 become aligned with the tension in the straps and pull out of the tubular brackets 32, as shown in FIG. 5. The spring in each reel 38 retracts the straps 36 upwardly into the hard container 16, so that they do not obstruct evacuation of passengers through the doorway.

Inflation of the escape slide begins when the pack board has passed through the doorway 2, and inflation continues until the escape slide is fully inflated, as shown in FIG. 1.

The apparatus of this invention provides for the positive displacement of the slide pack 28 outwardly through the doorway, so that there is no danger that the slide will be rendered inoperative for failure to eject the slide through the doorway. Furthermore, the ejector mechanism is fabricated of components which are relatively light in weight and therefore do not add measurably to the weight of the assembly. These components are also easy to install and maintain. The ejector straps are retracted from the doorway, so that none of the components of the apparatus would interfere with the evacuation of passengers.

What is claimed is:

1. Emergency aircraft evacuation apparatus for aircraft of the type having a doorway and a door movable from a closed position to an open position by retracting upwardly into the upper part of the fuselage, said apparatus comprising:
   a. an inflatable escape slide having girt means for securing one end of the escape slide to the aircraft adjacent the sill of the doorway,
   b. board means,
   c. pack means on said board means for temporarily storing said escape slide in a deflated and folded condition,
   d. guide means on said door for temporarily supporting said board means when said door is closed, and
   e. ejector means connected between said board means and said door, said ejector means being operable to displace said board means through said doorway when said door is moved upwardly.

2. The apparatus according to claim 1 wherein said ejector means includes at least one ejector strap extending between said board means and said door.

3. The apparatus according to claim 2 wherein said ejector means includes at least one pivoted arm on said board means movable from a retracted position to an extended position and including spring means biasing said arm towards said extended position, and including sleeve means connecting said arm with said ejector strap, the length of said arm being greater than the distance between said strap and said board means when said board means is mounted on said door, whereby said arm and said strap cooperate to swing said board means outwardly through said doorway when said door is raised.

4. The apparatus according to claim 2 wherein said ejector means includes means for disconnecting said strap from said board means upon movement of said board means through said doorway.

5. The apparatus according to claim 3 wherein said ejector means includes an elastic link in said ejector strap between said sleeve means and said board means.

6. The apparatus according to claim 1 wherein said ejector means includes a pair of ejector straps and a pair of connector means for attaching each of said straps to said board means adjacent the door sill, said connector means being spaced apart from each other to allow the girt means to extend between them.

7. The apparatus according to claim 6 wherein said ejector means includes a pair of arms on said board means opposite said pair of straps, releasable guide means between said arms and said straps, elastic link means in said straps for temporarily storing energy, and spring means urging said arms away from said board means, whereby said ejector straps cooperate with said arms to urge said board means outwardly through said doorway.

8. In an aircraft evacuation slide assembly of the type having a hard container mounted on the interior of the door of the fuselage and a pack board slidably received in the container for supporting a slide pack, said hard container having a trap door at the bottom through which the slide pack and pack board passes when the door is raised vertically, the improvement comprising:
   a. at least one ejector strap;
   b. attachment means for connecting said strap to said pack board adjacent the lower end thereof;
   c. arm means adjacent the upper end of said pack board, said arm means being extendable outwardly from said pack board, said strap being connected with said arm means and including spring means opposing the extending movement of said arm means;
   d. said ejector strap including means for connection with said container.

9. The assembly according to claim 8 wherein said attachment means includes a tubular member and a pin member received in said tubular member, one of members being mounted on said pack board and the other of said members being mounted on said strap, said members being positioned to be retained together when said pack board is received in said container and to be released when said pack board is inverted.

10. The assembly according to claim 8 wherein said arm means includes an arm member and a sleeve member, one of said members being supported on said pack board and the other of said members being supported on said strap, said members being arranged in telescoping relation, whereby movement of said pack board away from said strap causes separation of said members from each other.

11. The assembly according to claim 10 wherein said spring means includes an elastic link in said strap between said arm means and said attachment means.

12. A method for deploying an inflatable escape slide through the doorway of an aircraft in which the door is movable from a closed position to an open position by sliding upwardly inside the fuselage to a stored position above the doorway, the method comprising:
   a. packing the inflatable escape slide on a pack board,
   b. mounting said pack board on the inside of the door,
   c. attaching the girt bar of the escape slide to the floor of the aircraft when the door is closed,
   d. attaching at least one strap to the pack board adjacent the girt and the opposite ends of the strap to the door,
   e. subsequently raising said door while said girt holds said pack board stationary, and
   f. applying an outward force on the pack board while maintaining tension in said strap to swing said pack board through said doorway about said girt bar when said door has raised above the height of the pack board.

13. The method according to claim 12 including resiliently biasing said pack board to swing outwardly when said door is raised.

14. The method according to claim 12 including releasing said strap from said pack board after said pack board swings through said doorway.

* * * * *